United States Patent
Graf

(10) Patent No.: US 8,863,922 B2
(45) Date of Patent: Oct. 21, 2014

(54) BEARING CENTERING PLATE CENTERED ON A PISTON

(75) Inventor: Mark Graf, Creston, OH (US)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 268 days.

(21) Appl. No.: 13/433,034

(22) Filed: Mar. 28, 2012

(65) Prior Publication Data

US 2012/0247900 A1   Oct. 4, 2012

Related U.S. Application Data

(60) Provisional application No. 61/468,895, filed on Mar. 29, 2011.

(51) Int. Cl.
*F16H 45/02* (2006.01)

(52) U.S. Cl.
CPC ........ *F16H 45/02* (2013.01); *F16H 2045/0278* (2013.01); *F16H 2045/0205* (2013.01)
USPC ...................................... 192/3.29; 192/110 B

(58) Field of Classification Search
CPC ................................................. F16H 2041/24
USPC .......... 192/3.29, 3.33, 85.38, 110 B; 384/441
See application file for complete search history.

(56) References Cited

U.S. PATENT DOCUMENTS

| 4,573,561 | A  | * | 3/1986 | Deem et al. ................ | 192/85.49 |
| 6,926,131 | B1 |   | 8/2005 | Arhab et al. |  |
| 7,802,668 | B2 | * | 9/2010 | Peri et al. .................. | 192/110 B |
| 2006/0096823 | A1 | * | 5/2006 | Maeda et al. ................ | 192/3.29 |
| 2008/0142325 | A1 | * | 6/2008 | Degler et al. ................ | 192/3.29 |
| 2012/0055754 | A1 | * | 3/2012 | Mueller et al. ............ | 192/110 B |

* cited by examiner

*Primary Examiner* — Richard M. Lorence
(74) *Attorney, Agent, or Firm* — Simpson & Simpson, PLLC

(57) ABSTRACT

An assembly for a clutch, including a piston plate having an annular portion with a first substantially circumferentially aligned surface, and a bearing centering plate including at least one second substantially circumferentially aligned surface engaged with the first surface, the bearing centering plate arranged to retain a thrust bearing or bushing. An assembly for a clutch, including a piston plate having a first surface aligned with an axis of rotation for the clutch, at a first substantially uniform distance from the axis, and facing radially outward, a thrust bearing or bushing, and a bearing centering plate. The bearing centering plate including at least one second surface arranged to contact the first surface, and at least one third surface aligned with the axis, at a second substantially uniform distance from the axis, facing radially inward or radially outward, and arranged to contact a circumference of the thrust bearing or the bushing.

11 Claims, 6 Drawing Sheets

BEARING CENTERING PLATE CENTERED ON A PISTON

CROSS-REFERENCE TO RELATED APPLICATIONS

This patent claims the benefit under 35 U.S.C. §119(e) of U.S. Provisional Patent Application No. 61/468,895 filed Mar. 29, 2011, which application is incorporated herein by reference.

FIELD OF THE INVENTION

The present disclosure relates to an assembly for a clutch including a bearing centering plate engageable with a piston plate to retain a thrust bearing or bushing.

BACKGROUND OF THE INVENTION

It is known to locate a thrust bearing or bushing between components of a torque converter to accommodate axial thrust and relative rotation of the components. For example, when an axial force urges the components toward each other, the thrust bearing or bushing is brought into contact with respective surfaces of the components and enables relative rotation between the components while minimizing wear on the components. U.S. Pat. No. 6,926,131 discloses a piston plate having an axial extension, proximate an inner circumference of the piston plate, for engaging a thrust bearing or bushing. Extensive cold working of the piston plate, and possible secondary operations, such as machining, are required to form such an extension and increase the cost and complexity associated with fabricating the piston plate.

BRIEF SUMMARY OF THE INVENTION

According to aspects illustrated herein, there is provided an assembly for a clutch, including a piston plate having an annular portion with a first substantially circumferentially aligned surface, and a bearing centering plate including at least one second substantially circumferentially aligned surface engaged with the first substantially circumferentially aligned surface. The bearing centering plate is arranged to retain a thrust bearing or a bushing.

According to aspects illustrated herein, there is provided an assembly for a clutch, including a piston plate having a first surface aligned with an axis of rotation for the clutch, at a first substantially uniform distance from the axis, and facing radially outward from the axis, a thrust bearing or a bushing, and a bearing centering plate. The bearing centering plate has at least one second surface arranged to contact the first surface; and at least one third surface aligned with the axis and at a second substantially uniform distance from the axis. The at least one third surface faces radially inward toward the axis and is arranged to contact an outer circumference of the thrust bearing or the bushing, or faces radially outward from the axis and is arranged to contact an inner circumference of the thrust bearing or the bushing.

According to aspects illustrated herein, there is provided a torque converter, including a turbine, a hub fixedly secured to the turbine and arranged to engage an input shaft, a damper assembly having a flange engaged with the hub, and a clutch. The clutch includes a piston plate with a first circumferential surface, where the piston plate is displaceable to open and close the clutch, a bearing centering plate, and a thrust bearing or bushing. The bearing centering plate includes at least one first surface engaged with the first circumferential surface and at least one second surface. The thrust bearing or a bushing is in contact with the at least one second surface. Contact between the bearing centering plate and the thrust bearing or the bushing restrains the thrust bearing or the bushing in a radial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE INVENTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
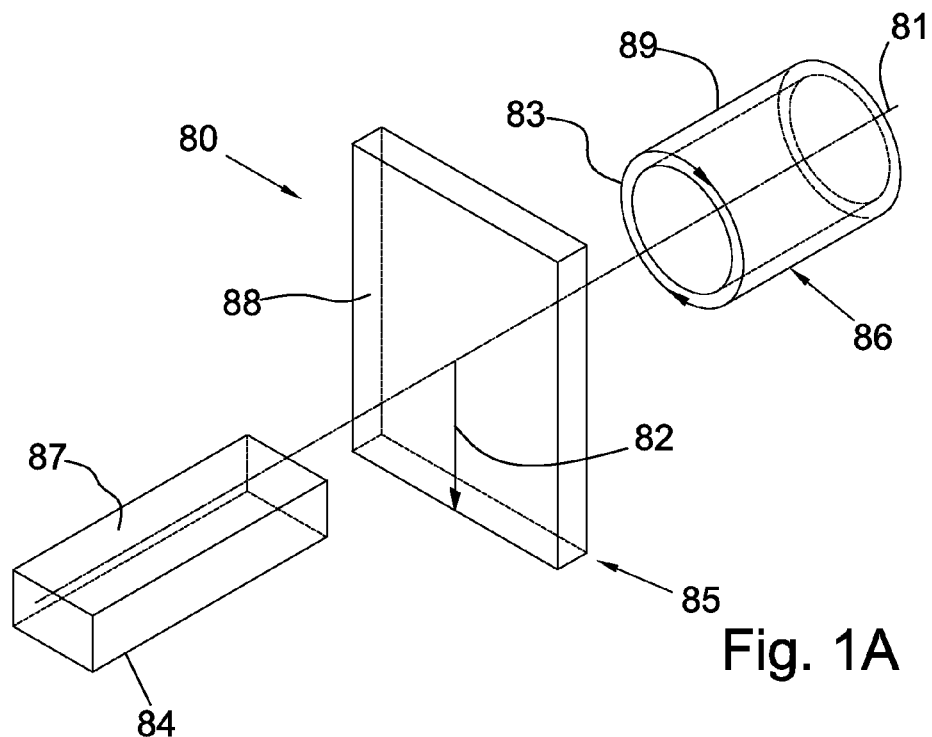
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
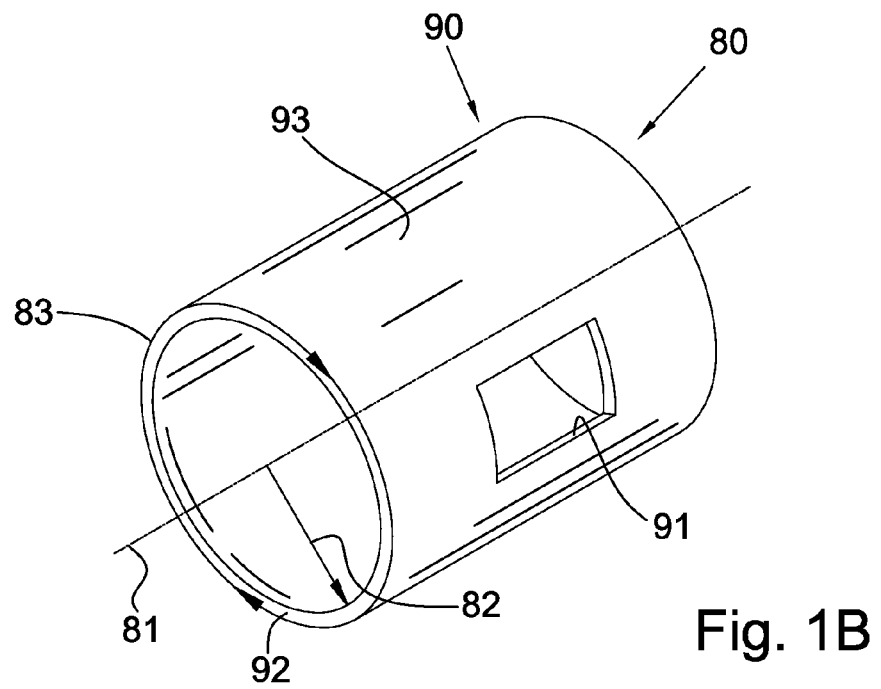
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
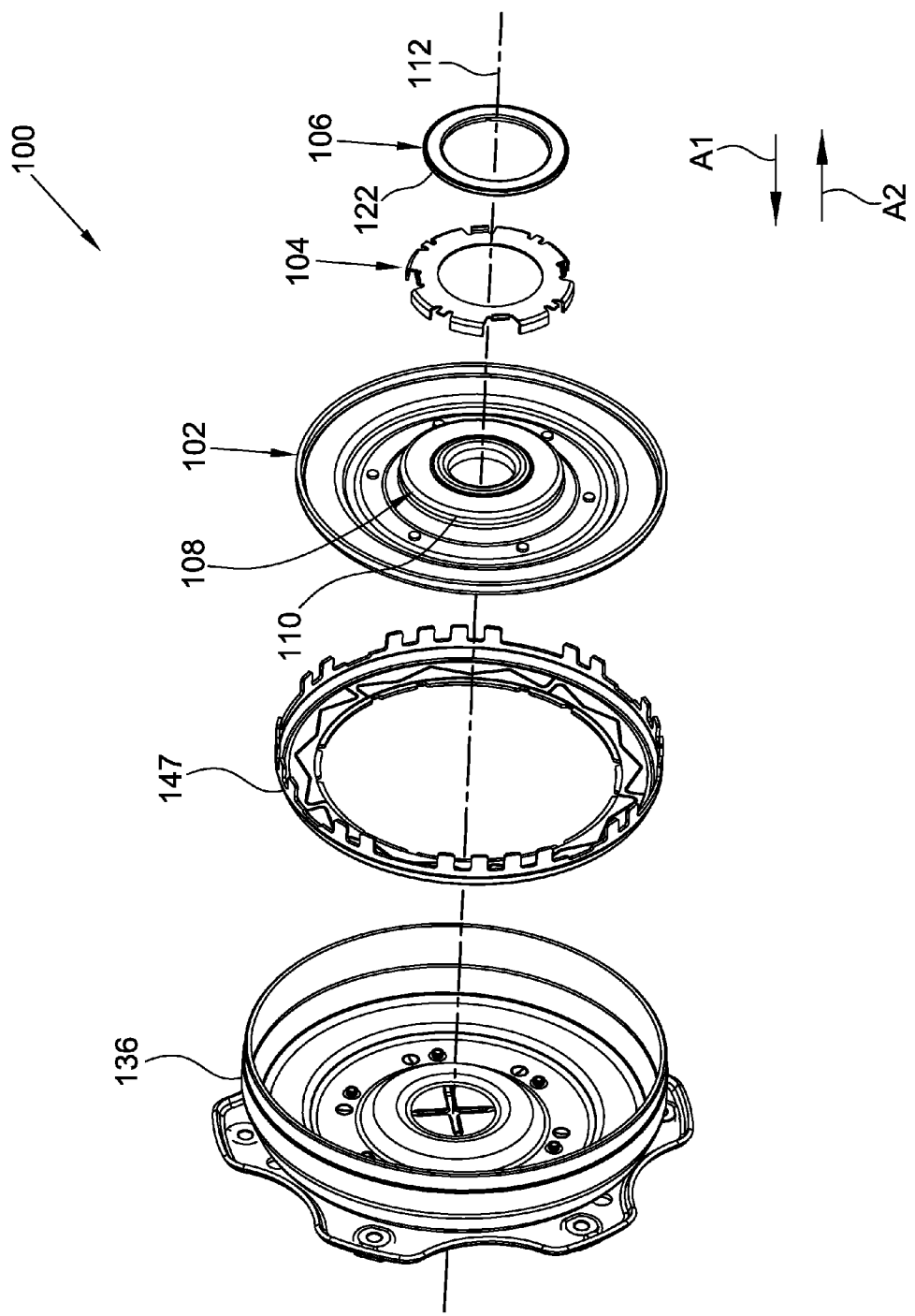
FIG. 2 is an exploded perspective view of an assembly for a clutch, a plate for the clutch, and a cover for a torque converter.

FIG. 2 is an exploded view of assembly 100 for a clutch, a plate for the clutch, and a cover for a torque converter.

Figure 3:
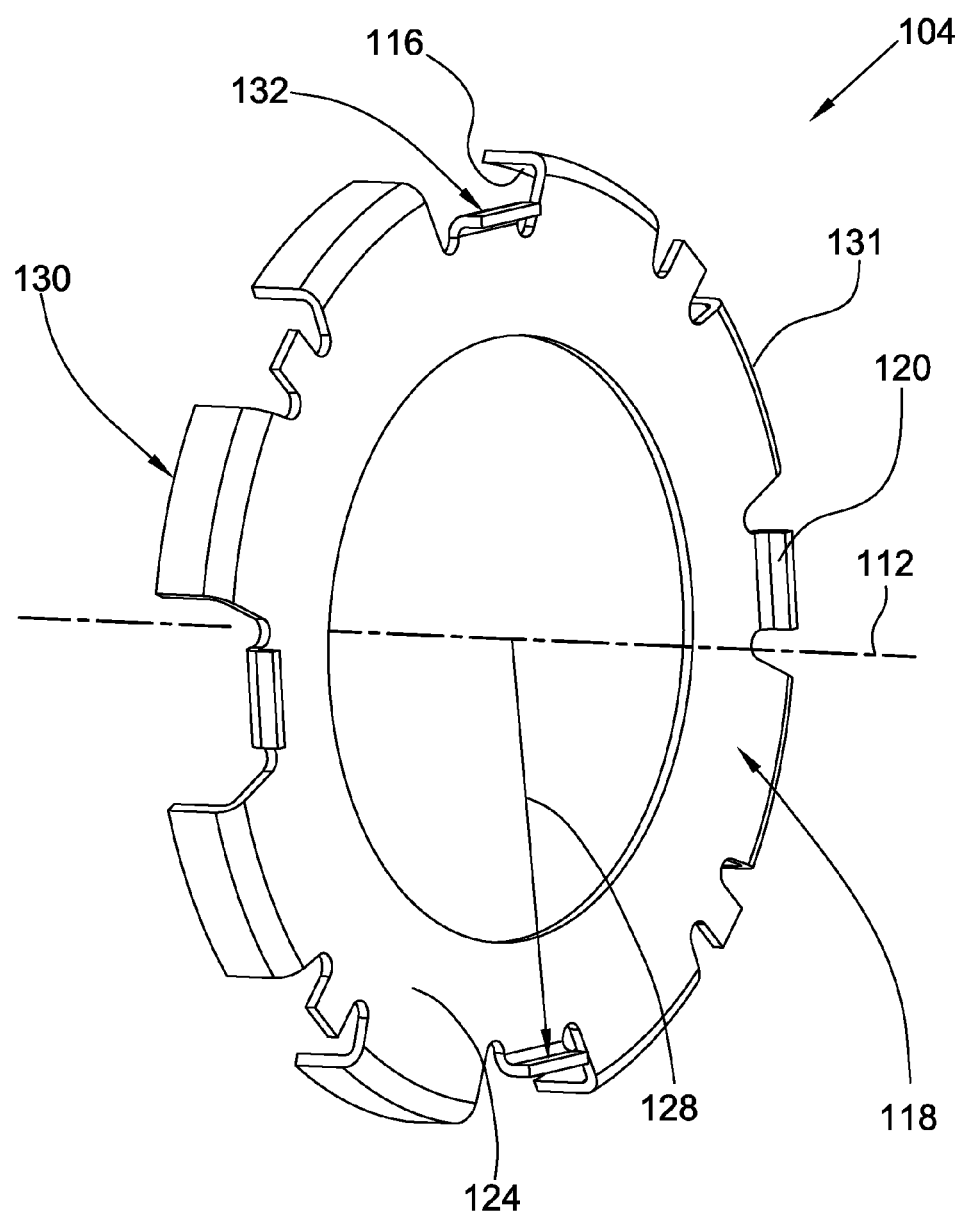
FIG. 3 is a perspective view of the bearing centering plate shown in FIG. 2.

FIG. 3 is a perspective view of the bearing centering plate shown in FIG. 2.

Figure 4:
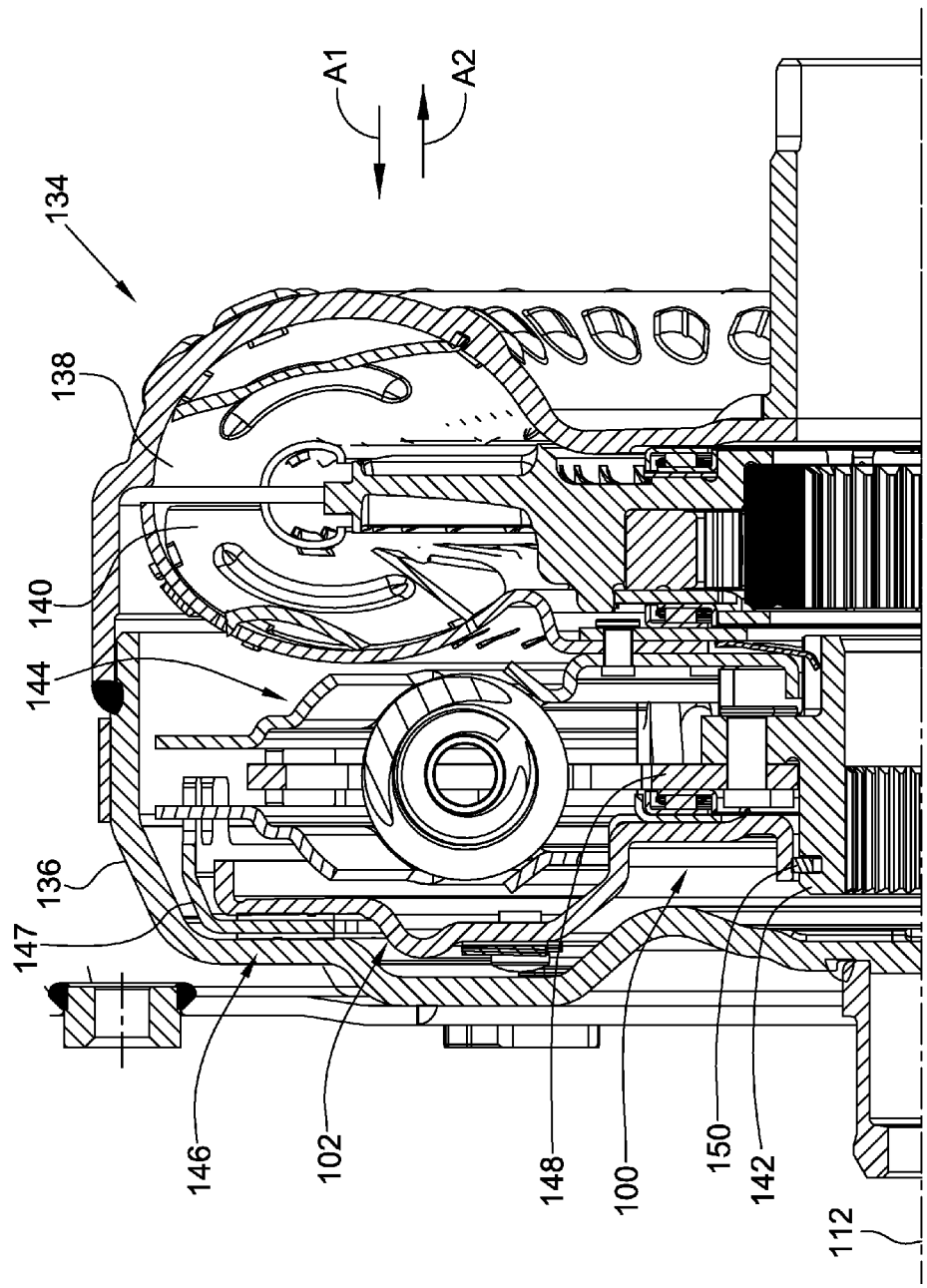
FIG. 4 is a partial cross-sectional view of a torque converter including the assembly for a clutch, plate for the clutch, and cover shown in FIG. 2.

FIG. 4 is a partial cross-sectional view of a torque converter including assembly 100 for a clutch, the plate for the clutch, and the cover shown in FIG. 2.

Figure 5:
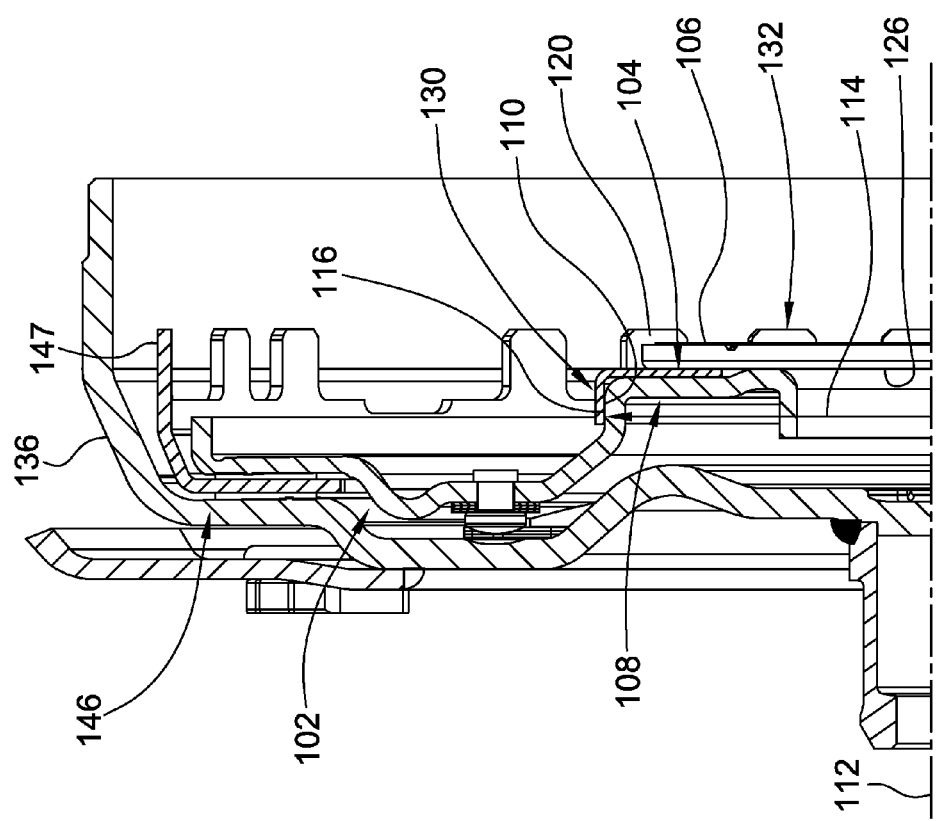
FIG. 5 is a partial cross-sectional view of a portion of the torque converter shown in FIG. 4 including the assembly for a clutch; and, FIG. 6 is a perspective view of a bearing centering plate.

FIG. 5 is a partial cross-sectional view of a portion of the torque converter shown in FIG. 4 including assembly 100 for a clutch. The following should be viewed in light of FIGS. 2 through 5. Assembly 100 includes piston plate 102 and bearing centering plate 104. In an example embodiment, the assembly includes thrust bearing or bushing 106. A thrust bearing is referenced in the discussion that follows; however, it should be understood that the discussion also is applicable to a bushing. Plate 102 includes annular portion 108 with surface 110. Surface 110 is substantially circumferentially aligned. By "substantially circumferentially aligned" we mean that the general orientation of the surface is circumferential, but that the orientation may vary to a degree from a purely circumferential orientation. For example, the surface may have a slight tilt in an axial direction. Surface 110 also can be described as being aligned with axis of rotation 112 for the clutch, at substantially uniform distance 114 from the axis, and facing radially outward from the axis. By "substantially uniform distance" we mean that some variation of distance 114 along surface 110 in an axial direction is possible.

The bearing centering plate includes at least one substantially circumferentially aligned surface 116 engaged with surface 110. The bearing centering plate is arranged to retain the thrust bearing with at least one surface 118. Portion 120 of surface 118 is a substantially circumferentially aligned surface and is arranged to engage outer circumference 122 of the thrust bearing to restrain the thrust bearing in an radial direction. In an example embodiment (not shown), surface 118 is a substantially circumferentially aligned surface and is arranged to engage an inner circumference of the thrust bearing or bushing. In an example embodiment, portion 124 of surface 118 is radially disposed and in contact with radially disposed surface 126 of the thrust bearing. Portion 120 can be described as being aligned with axis of rotation 112, at substantially uniform distance 128 from the axis, and facing radially inward toward the axis. By "substantially uniform distance" we mean that some variation of distance 128 along portion 120 in an axial direction is possible. Thus, surface 116 radially aligns plate 104 with plate 102, and portion 120 radially aligns the thrust washer with plate 104.

In an example embodiment, the bearing centering plate includes a plurality of protrusions 130 extending substantially in axial direction A1. By "substantially in axial direction" we mean that the general orientation of the protrusions is an axial direction, but that the orientation may vary to a degree from a purely axial orientation. For example, the protrusions may have a slight tilt in an axial direction. Protrusions 130 form surfaces 116. In an example embodiment, protrusions 130 extend from outer circumference 131 of plate 104. In an example embodiment, the bearing centering plate includes a plurality of protrusions 132 extending substantially in axial direction A2, opposite direction A1. Protrusions 132 form portion 120. In an example embodiment, protrusions 132 are located radially inward of protrusions 130. Although particular numbers of protrusions 130 and 132 are shown, it should be understood that other respective numbers of protrusions 130 and 132 are possible. It should also be understood that other configurations of protrusions 130 and 132 are possible. For example, protrusions 132 may be located radially outward of protrusions 130 or may extend from an inner circumference of plate 104.

In an example embodiment, assembly 100 is located in torque converter 134 which includes cover 136 arranged to receive torque from a prime mover (not shown), impeller 138, turbine 140, hub 142, damper assembly 144, and clutch 146 including plate 147. Clutch 146 includes assembly 100. The turbine is fixed to the hub, for example, to transmit torque to the hub. Flange 148 of the damper assembly is engaged with the hub to transmit torque to the hub. In the configuration shown in FIGS. 4 and 5, the piston plate is sealed with respect to the hub by sealing element 150 and is displaceable with respect to the hub. In an example embodiment, clutch 146 is a lock up clutch. When the clutch is open, torque flows from the cover to the impeller. When the clutch is closed, the clutch connects cover 136 to the damper assembly, bypassing the impeller and turbine, such that torque flows from the cover directly to the damper assembly.

The thrust washer enables relative rotation between the piston plate and other components of a torque converter, typically a hub such as hub 142 or a component of a damper assembly, such as flange 148. The thrust washer enables the relative rotation while eliminating or minimizing frictional engagement of the piston plate and the other components, which reduces wear on the piston plate and the other components. For example, in the configuration shown in FIG. 4, force is applied to the piston plate to displace the piston plate in axial direction A2 to open the clutch. Similarly, pressure applied to the piston plate to close the clutch also applies a force to the hub in axial direction A1, towards the piston plate. These forces compress the thrust bearing between the piston plate and the flange, and the thrust bearing enables the relative rotation of the piston plate and the flange.

In an example embodiment (not shown), assembly 100 is located in a transmission.

In an example embodiment, plate 104 is formed by stamping. In an example embodiment, material remaining from the stamping of a different component, for example, a core ring for a torque converter, is used as the blank for the plate. Advantageously, this process reduces costs by using a piece of material that is otherwise scrap and eliminates stamping operations that would otherwise be necessary to produce a blank for the plate. As noted supra, the prior art teaches complex and costly operations on a piston plate to modify the piston plate to engage a thrust washer or bushing. In an example embodiment, piston plate 102 is formed by stamping. Advantageously, as part of the stamping process, portion 108 of piston plate 106 is formed without the need for additional and costly operations such as cold working or machining.

Although assembly 100 and torque converter 134 have been shown with respective particular configurations of components, it should be understood that assembly 100 and torque converter 134 are not limited to the respective particular configuration of components shown and that other respective configurations of components are possible.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

Figure 6:
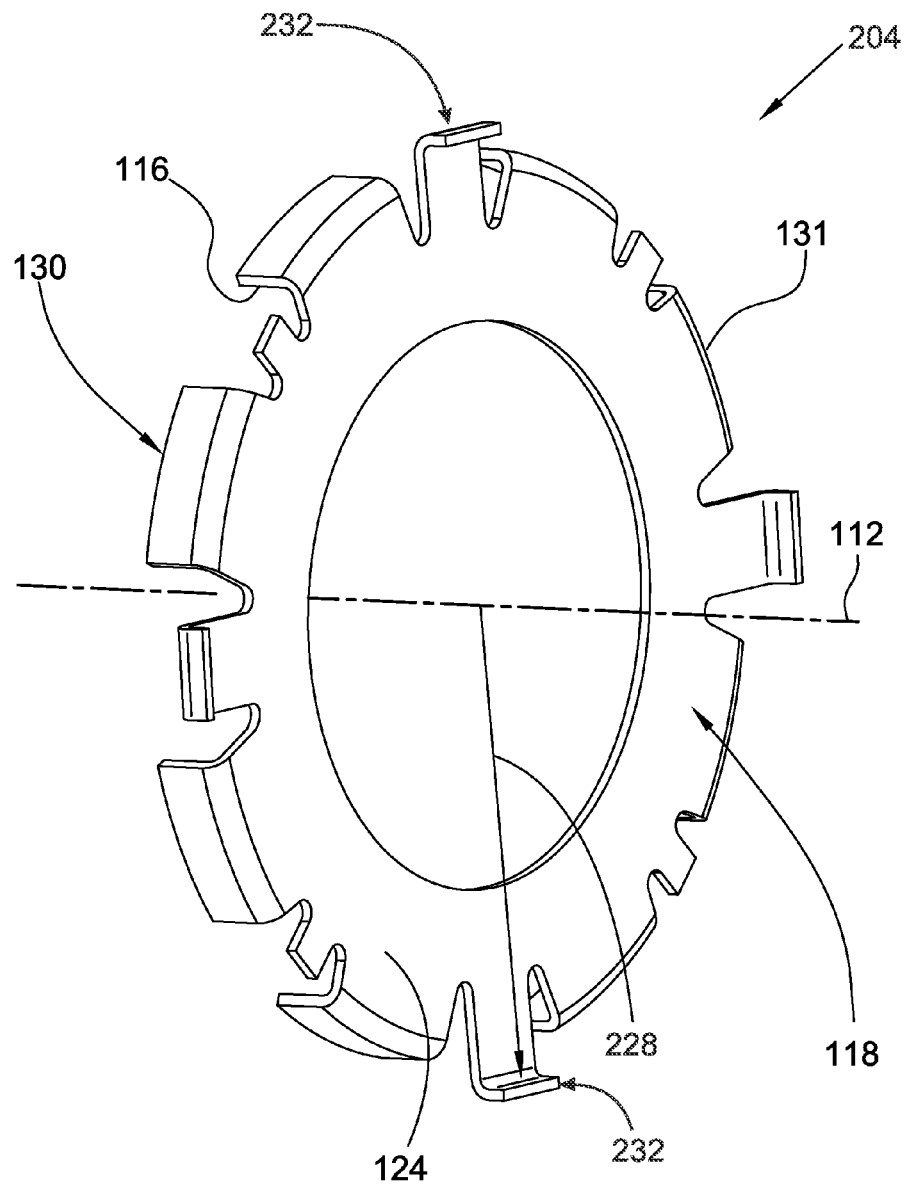

FIG. 6 is a perspective view of bearing centering plate 204. Plate 204 includes protrusions 130 and protrusions 232 with portions 220. Portions 232 are located at substantially uniform distance 228 from axis 112. Unlike protrusions 132 for plate 104, protrusions 232 are located radially outward of protrusions 130.

What is claimed is:

1. An assembly for a clutch, comprising:
   a piston plate including an annular portion with a first substantially circumferentially aligned surface; and,
   a bearing centering plate including at least one second substantially circumferentially aligned surface engaged with the first substantially circumferentially aligned surface, the bearing centering plate arranged to retain a thrust bearing or a bushing, wherein the bearing centering plate includes:
      a first plurality of protrusions extending in a first substantially axial direction from an outer circumference of the bearing centering plate and forming the second substantially circumferentially aligned surface; and,
      a second plurality of protrusions extending in a second substantially axial direction, opposite the first substantially axial direction, and arranged to retain the thrust bearing or the bushing.

2. An assembly for a clutch, comprising:
   a piston plate including a first surface aligned with an axis of rotation for the clutch, at a first substantially uniform distance from the axis, and facing radially outward from the axis;
   a thrust bearing or a bushing; and,
   a bearing centering plate including:
      at least one second surface arranged to contact the first surface; and,
      at least one third surface aligned with the axis, at a second substantially uniform distance from the axis, wherein the at least one third surface:
         faces radially inward toward the axis and is arranged to contact an outer circumference of the thrust bearing or the bushing; or,
         faces radially outward from the axis and is arranged to contact an inner circumference of the thrust bearing or the bushing, wherein the bearing centering plate includes:
      a first plurality of protrusions extending in a first axial direction from an outer circumference of the bearing centering plate and forming the at least one second surface; and,
      a second plurality of protrusions extending in a second axial direction, opposite the first axial direction, and forming the at least one third surface.

3. The assembly of claim 2, wherein the second plurality of protrusions is located radially inward of the first plurality of protrusions.

4. The assembly of claim 2, wherein the second plurality of protrusions is located radially outward of the first plurality of protrusions.

5. A torque converter, comprising:
   a turbine;
   a hub arranged to engage an input shaft;
   a damper assembly including a flange for transmitting torque from the turbine to the hub; and,
   a clutch including:
      a piston plate with a first circumferential surface facing radially outward from an axis of rotation for the clutch, the piston plate displaceable to open and close the clutch;
      a bearing centering plate including:
         at least one second surface engaged with the first circumferential surface; and,
         at least one third surface; and,
      a thrust bearing or a bushing in contact with the at least one third surface, wherein contact between the bearing centering plate and the thrust bearing or the bushing restrains the thrust bearing or the bushing in a radial direction.

6. The torque converter of claim 5, wherein:
   the bearing centering plate includes a plurality of protrusions extending in an axial direction; and,
   the plurality of protrusions form the at least one second surface.

7. The torque converter of claim 5, wherein:
   the thrust washer includes a first radially aligned surface;
   a first portion of the at least one third surface includes an at least one second circumferential surface engaged with an outer or an inner circumference of the thrust bearing or the bushing; and,
   a second portion of the at least one third surface includes a second radially aligned surface in contact with the first radially aligned surface.

8. The torque converter of claim 5, wherein the at least one third surface includes an at least one second circumferential surface engaged with an outer or an inner circumference of the thrust bearing or the bushing.

9. The torque converter of claim 8, wherein:
   the bearing centering plate includes a plurality of protrusions extending in an axial direction; and,
   the plurality of protrusions form the at least one second circumferential surface.

10. The torque converter of claim 5, wherein the bearing centering plate includes:
    a first plurality of protrusions extending in a first axial direction from an outer circumference of the bearing centering plate and forming the at least one second surface; and,
    a second plurality of protrusions extending in a second axial direction, opposite the first axial direction, and arranged to contact an outer or an inner circumference of the thrust bearing.

11. The torque converter of claim 5, wherein: displacement of the piston plate in a first axial direction to open the clutch compresses the thrust bearing or the bushing between the piston plate and the flange.

* * * * *